United States Patent [19]

Huon et al.

[11] Patent Number: 4,734,676
[45] Date of Patent: Mar. 29, 1988

[54] METHOD AND DEVICE FOR DETECTING A PARTICULAR BIT PATTERN IN A SERIAL TRAIN OF BITS

[75] Inventors: Simon Huon, Roquefort les Pins; Victor Spagnol, Cagnes sur Mer, both of France

[73] Assignee: International Business Machines Corp., Armonk, N.Y.

[21] Appl. No.: 745,548

[22] Filed: May 17, 1985

[30] Foreign Application Priority Data

Jun. 29, 1984 [EP] European Pat. Off. ....... 84430025.1

[51] Int. Cl.⁴ ........................... G05B 1/00; G06F 7/38
[52] U.S. Cl. .................................. 340/146.2; 364/715
[58] Field of Search ... 364/200 MS File, 900 MS File, 364/728, 715; 340/146.2

[56] References Cited

U.S. PATENT DOCUMENTS

| 3,766,316 | 10/1973 | Hoffman et al. | 377/116 |
| 3,784,980 | 1/1974 | Geesen | 340/146.2 |
| 4,443,860 | 4/1984 | Vidalin | 340/146.2 |
| 4,524,427 | 6/1985 | Vidalin et al. | 340/146.2 |
| 4,525,803 | 6/1985 | Vidalin et al. | 340/146.2 |

FOREIGN PATENT DOCUMENTS 58-15351 1/1983 Japan .

OTHER PUBLICATIONS

Erdmann, Jr., "A Serial Data Analyzer for Locating Faults in a Decentralized Digital System", Hewlett-Packard Journal, vol. 30, No. 10, Oct. 1979, pp. 23-28.
Cholat-Namy, "Local Loop Test for Multi-Port Modems", IBM Technical Disclosure Bulletin, vol. 22, No. 11, Apr. 1980, pp. 4956-4957.

*Primary Examiner*—Gary V. Harkcom
*Assistant Examiner*—Long Thanh Nguyen
*Attorney, Agent, or Firm*—John B. Frisone

[57] ABSTRACT

Memory 60 contains a decision table which is a replica of the particular N-bit pattern to be detected. When a bit is received over line 12, a table lookup operation is performed to determine whether the entry at the address indicated by address counter 34 contains a bit that matches the received bit. If so, the content of the address counter is incremented by one and the device waits for another bit to be received over line 12. If the bit in the entry does not match the received bit, then, if the address indicated by the counter is zero, the count of the counter is maintained at zero and the device waits for another bit to be received; or, if the address is different from zero, the counter is reset to zero and the bit present on line 12 is again presented to the table in order, this time, to be compared with the bit in the entry at address zero. The pattern is detected when the address contained in the counter is equal to N and when the last bit in the pattern matches the bit with which it is compared.

2 Claims, 4 Drawing Figures

METHOD AND DEVICE FOR DETECTING A PARTICULAR BIT PATTERN IN A SERIAL TRAIN OF BITS

DESCRIPTION

Technical Field

This invention relates to communication systems and, more particularly, to a method and device for detecting a particular bit pattern in a serial train of bits.

Background Art

A data communication system is essentially comprised of a couple of data terminal equipment (DTEs) that exchange data over a data circuit. Typically, such a circuit includes two modems interconnected by a transmission line, each modem being directly attached to an associated DTE. The main function of a modem is to convert the data bits from the associated DTE into signals suitable for transmission over the transmission line, and conversely. During operation in the data mode, that is, while data are being transmitted, the modems are transparent to the data they are transferring from the DTE to the transmission line and vice versa.

Today's communication systems are becoming increasingly complex, and it is by no means unusual for such a system to comprise several dozens of modems. This complexity has created a need for automatic system maintenance facilities, and more particularly for means capable of automatically testing the operation of the modems.

One approach to testing the modems consists in having the tests performed under the control of the DTEs. However, this necessitates an exchange of data between the modems and the DTEs, which is not possible in the data mode of operation, as mentioned above. In order for such an exchange to take place, some means must be provided to enable a DTE to inform the associated modem that the data it will transmit next are specifically intended for that modem.

An article by S. Huon and R. Smith entitled "Network Problem-Determination Aids in Microprocessor-Based Modems", published in the IBM Journal of Research and Development, Vol. 25, No. 1, January 1981, describes a modem testing technique in which the DTE informs the attached modem that the next data to be received form a test command, by activating a particular control lead, designated TC, in the interface between the DTE and the modem. However, this technique has a limitation in that it requires both the modem and the DTE to be provided with said control lead and the associated control circuits. To overcome this difficulty, it has been proposed to replace the control lead by a test command sent by the DTE over its data transmission lead, and to cause the modem to monitor permanently the data bits received from the DTE and to switch to a non-transparent mode upon detecting such a test command among the data bits.

However, the detection of the test command raises two main difficulties :

The bit pattern selected to represent the command should be most unlikely to be encountered during normal data transmission. An example of such a bit pattern is given in an article by M. Choquet et al. entitled "Remote Modem Control", in the IBM Technical Disclosure Bulletin, Vol. 26, No. 2, May 1984, page 6636.

The process of detecting said bit pattern, which is taking place permanently, should require as little computing power as possible, this being somewhat limited in modems.

SUMMARY OF THE INVENTION

It is the object of this invention to provide a method and device for detecting a particular bit pattern in a serial train of bits, that only require a minimal computing power.

The present method of detecting a particular pattern of N bits in a serial train of bits is characterized in that it comprises the steps of :

(a) setting an address value to zero at the beginning of the detection process, (b) comparing the first bit in the train of bits with the first bit in the bit pattern to be detected, and incrementing said address value by one if the two bits being compared match or maintaining the address value at zero if they do not, (c) successively comparing the other bits in the train of bits with the bit whose position in the bit pattern is given by the address value, and either incrementing the address value by one if the two bits being compared match, or resetting the address value to zero if said two bits do not match, and comparing said bit in the train of bits with the first bit in said bit pattern as in step (b) above, and (d) determining that said bit pattern has been detected, when the address value is N and the last bit in said bit pattern matches the bit with which it is being compared in the train of bits.

In accordance with another aspect of the invention, the method of detecting a particular N-bit pattern in a serial train of bits is characterized in that it comprises the steps of:

examining the individual bits contained in the train of bits, and if the bit being examined has a first binary value, addressing an entry in a first table of N entries, with the $n^{th}$ entry comprising an information item denoting either a match or a mismatch according to whether the $n^{th}$ bit in the pattern to be detected has said first binary value or not, the address of said entry being indicated by an address generator, or if the bit being examined has a second binary value that is the opposite of said first binary value, addressing an entry in a second table of N entries, with the $n^{th}$ entry comprising an information item denoting a match or a mismatch according to whether the $n^{th}$ bit in the pattern to be detected has said second binary value or not, the address of said entry being indicated by said address generator, incrementing by one the content of said address generator if the entry being addressed comprises an information item denoting a match, and then examining the next bit in the train of bits, resetting to zero the address generator if the entry being addressed comprises an information item denoting a mismatch, and if said entry is the first entry in either of said two tables, examining the next bit in the train of bits, or if said entry being addressed is not the first entry in either of said two tables, addressing the first entry in the table that corresponds to the value of the bit being examined and, if it comprises an information item denoting a match, incrementing by one the content of the address generator and then examining the next bit in the train of bits, or, if said first entry comprises an information item denoting a mismatch, resetting to zero said address generator and then examining said next bit, and determining that the bit pattern has been detected, when the address generator contains said value N and the entry being addressed comprises an information item denoting a match.

In accordance with still another aspect of the invention, the two tables just mentioned are replaced by a single table.

The invention further provides a device for detecting a particular bit pattern in a serial train of bits.

These and other objects, features and advantages of the invention will be apparent from the following more particular description of the preferred embodiments of the invention as illustrated in the drawings.

DETAILED DESCRIPTION

Figure 1:
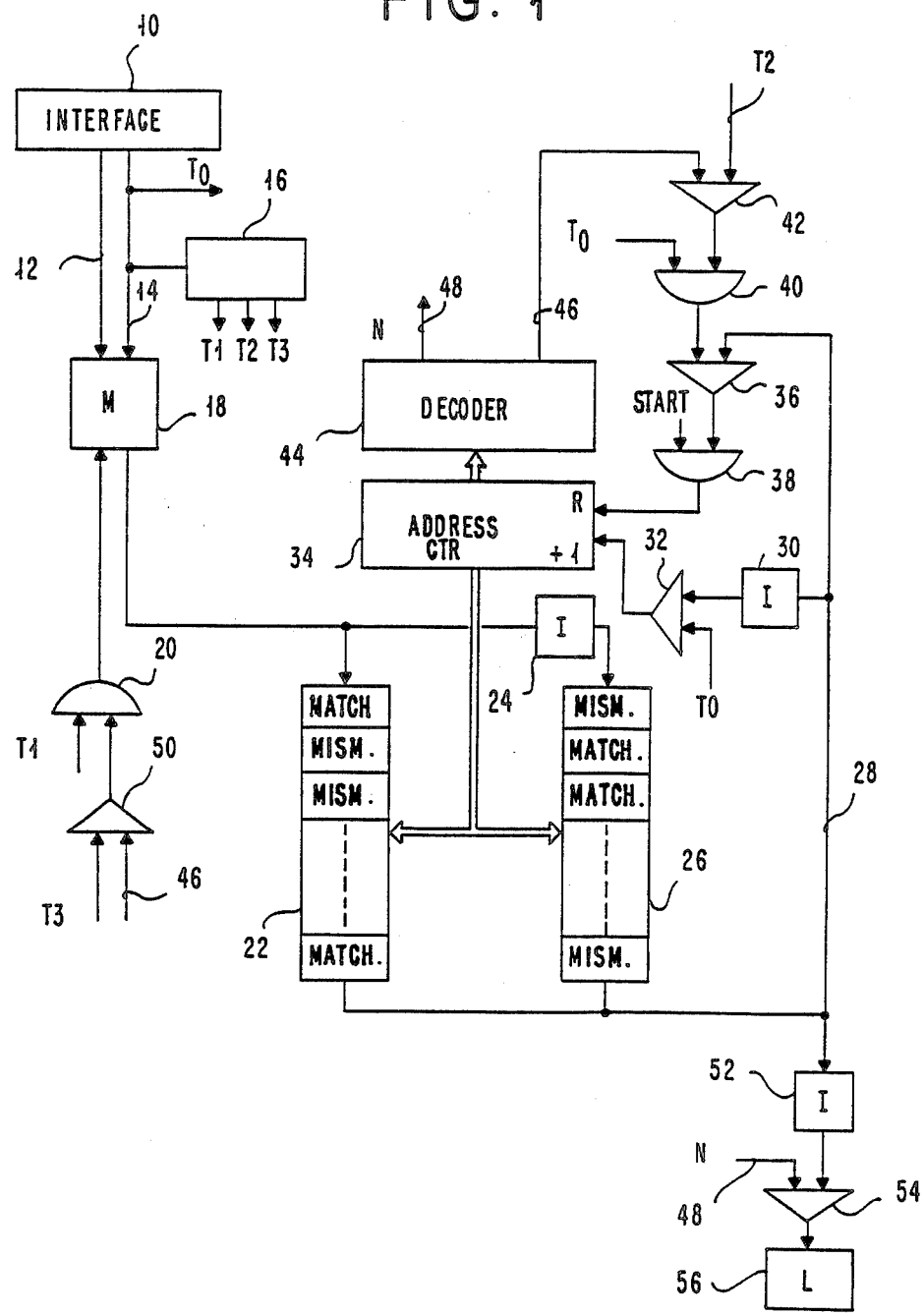
FIG. 1 is a block diagram illustrating a first embodiment of the invention.
Figure 2:
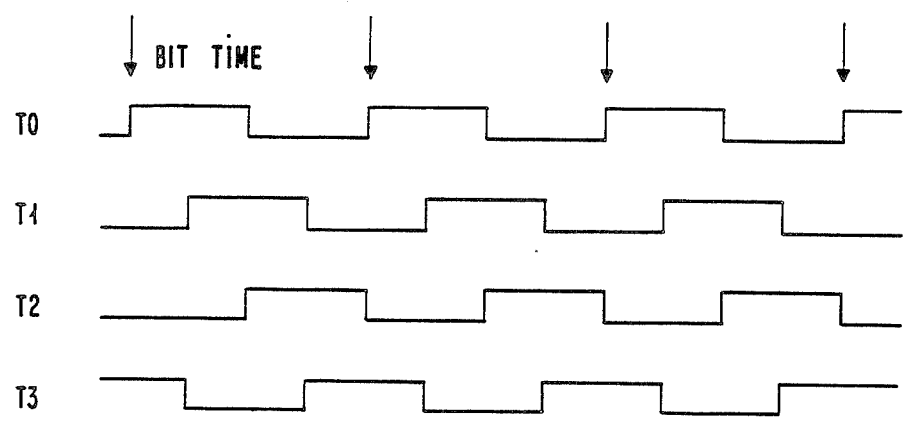
FIG. 2 is a timing diagram representing the timing signals used in the device of FIGS. 1 and 3.

The block diagram of FIG. 1 illustrates an exemplary embodiment of the invention as used in a modem to detect a known, particular bit pattern received together with data bits from an attached DTE. The interface between the modem and the DTE is shown as block 10. Typically, this may be a CCITT V24 interface. The data bits from the DTE are fed over a line 12 to the device of the present invention at the rate of 1/T bits per second as defined by a timing signal To sent over a line 14. Line 14 is connected to a timing device 16 which derives from signal To timing signals T1, T2, T3 which are respectively delayed T/4, T/2 and 3T/4 sec. with respect to To, as shown in FIG. 2.

Line 12 is connected to the input of a memory 18 which can store a single bit. Memory 18 has its write control input connected to line 14 and its read control input connected to the output of an OR gate 20. The output from memory 18 is directly applied to the control input of a read-only memory 22 having N×1 storage positions, with N being the number of bits in the pattern to be detected, and, through an inverter 24, to the read control input of a memory 26 similar to memory 22. The contents of memories 22 and 26 are read out under the control of a "0" bit applied to their respective read control inputs. The outputs of memories 22 and 26 are connected to each other as well as to a line 28 which is connected to the input of an inverter 30 whose output is applied to an input of an AND gate 32 the other input of which receives timing signal To. The output from AND gate 32 is applied to the incrementing (+1) input of an address counter 34 which has a number of bit positions such that N different address values can be generated. The output from counter 34 is applied in parallel to the address input of each of memories 22 and 26. Line 28 is further connected to an input of an AND gate 36 whose output is connected to an input of an OR gate 38 the other input of which receives a START signal. The output from OR gate 38 is applied to the reset (R) input of address counter 34. The other input of AND gate 36 is connected to the output of an OR gate 40 an input of which receives timing signal To and the other input of which is connected to the output of an AND gate 42. Address counter 34 is connected to a decoder 44 which has a first output connected by a line 46 to an input of AND gate 42, the other input of which receives timing signal T2, and a second output connected to a line 48. Decoder 44 activates line 46 when the content of counter 34 is different from zero, and line 48 when its content is equal to N. Timing signal T3 and the signal on line 46 are applied to the inputs of an AND gate 50 whose output is connected to the other input of OR gate 20. Line 28 is connected to an inverter 52 whose output is connected to an input of an AND gate 54, the other input of which is connected to line 48. The output from AND gate 54 is fed to a latch 56.

In the device shown in FIG. 1, the detection of the particular bit pattern referred to above involves the use of two decision tables, respectively designated "0's Table" and "1's Table" and stored in memories 22 and 24. Each table has a number of entries equal to the number of bits in the bit pattern to be detected, and each entry comprises an information item, such as a bit, denoting either a match or a mismatch condition associated with the corresponding bit in said bit pattern. For example, assume that the bit pattern to be detected is as follows:

"0 1 1 0 1 0 0 1 0 1 0 ... 1 0"

If so, the first entry in the 0's Table would comprise an information item denoting a match, the second and third entries in that table would each comprise an information item denoting a mismatch, the fourth entry would comprise an information item denoting a match, and so forth, with the $n^{th}$ entry comprising an information item denoting either a match or a mismatch according to whether the $n^{th}$ bit of the pattern to be detected is a "0" or a "1" bit.

Similarly, in the 1's Table, the first entry would comprise an information item denoting a mismatch, the second and third entries would each comprise an information item denoting a match, the fourth entry would comprise an information item denoting a mismatch, and so forth, with the $n^{th}$ entry comprising an information item denoting either a match or a mismatch according to whether the $n^{th}$ bit in the pattern to be detected is a "1" or a "0".

Corresponding entries in both tables comprise information items denoting opposite "match" or "mismatch" conditions. In the example shown in FIG. 1, "match" and "mismatch" conditions are respectively represented by a "0" bit and a "1" bit.

Assume now that, in operation, address counter 34 is initially set to zero by, for example, the START signal applied thereto through OR gate 38. At the first positive-going transition of signal To, the first bit received over line 12 is stored in memory 18. At the first positive-going transition of signal T1, which occurs T/4 sec. after the first transition of To, the bit stored in memory 18 is read out and applied to the input of memory 22 and inverter 24. If this bit is "1", memory 26 is selected and the first entry at address 0 of the 1's Table stored in that memory is read out and sent over line 28. Since the first bit of the bit pattern to be detected is, in this example, "0", the first entry comprises a "1" bit denoting a mismatch. This bit is sent over line 28 to AND gate 36, and address counter 34 will be reset to zero at the next transition of signal To. If the bit received from memory 18 is "0", memory 22 is selected and the first entry at address 0 of the 0's Table stored in memory 22 is read out and transferred over line 28. Since the first bit in the bit pattern to be detected is "0", this first entry comprises a "0" bit denoting a match. This "0" bit on line 28 deactivates AND gate 32 and conditions AND gate 32. The content of address counter 34 will be incremented by one at the next transition of signal To.

At the second positive-going transistion of signal To, the second bit received over line 12 is stored in memory 18 and address counter 34 is set to zero or to one depending on whether the list received during the preceding bit time resulted in a match or a mismatch as explained above.

At the next positive-going transition of signal T1, the bit stored in memory 18 is read out and applied to the input of memory 22 and inverter 24. If this bit is "1", memory 26 is selected and the second entry at address 1 of the 1's Table in that memory is read out and transferred over line 28. Since the second bit of the bit pattern to be detected is "1", this second entry comprises a "0" bit denoting a match. This "0" bit is sent over line 28, thereby deactivating AND gate 36 and conditioning AND gate 32. The content of address counter 34 will be incremented by one at the next transition of signal To.

If the bit received over line 12 is "0", memory 22 is selected and the second entry at address 1 of the 0's Table in that memory is read out and transferred over line 28. Since the second bit of the bit pattern to be detected is "1", said second entry comprises a "1" bit denoting a mismatch and this "1" bit is applied to AND gate 36 over line 28. Because the content of address counter 34 is different from zero, both AND gates 42 and 50 are activated by a NON 0 signal on line 46, and at the positive-going transition of signal T2 address counter 34 is reset to zero by the "1" bit received over line 28 through gates 36 and 38. At the positive-going transition of signal T3, the NON 0 signal on line 46 activates the read control input of memory 18, and the second bit received over line 12 and still stored in memory 18 is now read out and selectively presented to the 1's Table and the 0's Table in order, this time, to be compared with the contents of the first entries of these tables.

Generally, whenever a bit is received over line 12, a table lookup operation is performed in either the 0's Table or the 1's Table, depending on the value of the bit, to determine whether the entry at the address specified by address counter 34 comprises a bit denoting a match. If so, the content of counter 34 is incremented by one and the device waits for a new bit to be received over line 12.

On the other hand, if said entry comprises a bit denoting a mismatch, then, if the address specified by counter 34 is zero, the content of the counter is maintained at zero pending receipt of the next bit over line 12, and, if that address is different from zero, the counter is reset to zero and the bit present on line 12 is again presented to the same table, this time to be compared with the bit in the entry at address zero.

When counter 34 contains address N and the last entry in the table comprises a "0" bit denoting a match, a "0" bit is sent over line 28, inverted by inverter 52 and applied to AND gate 54, which is activated by the signal generated by decoder 44 on line 48, and causes latch 56 to set, thereby indicating that the particular bit pattern has been detected.

Figure 3:
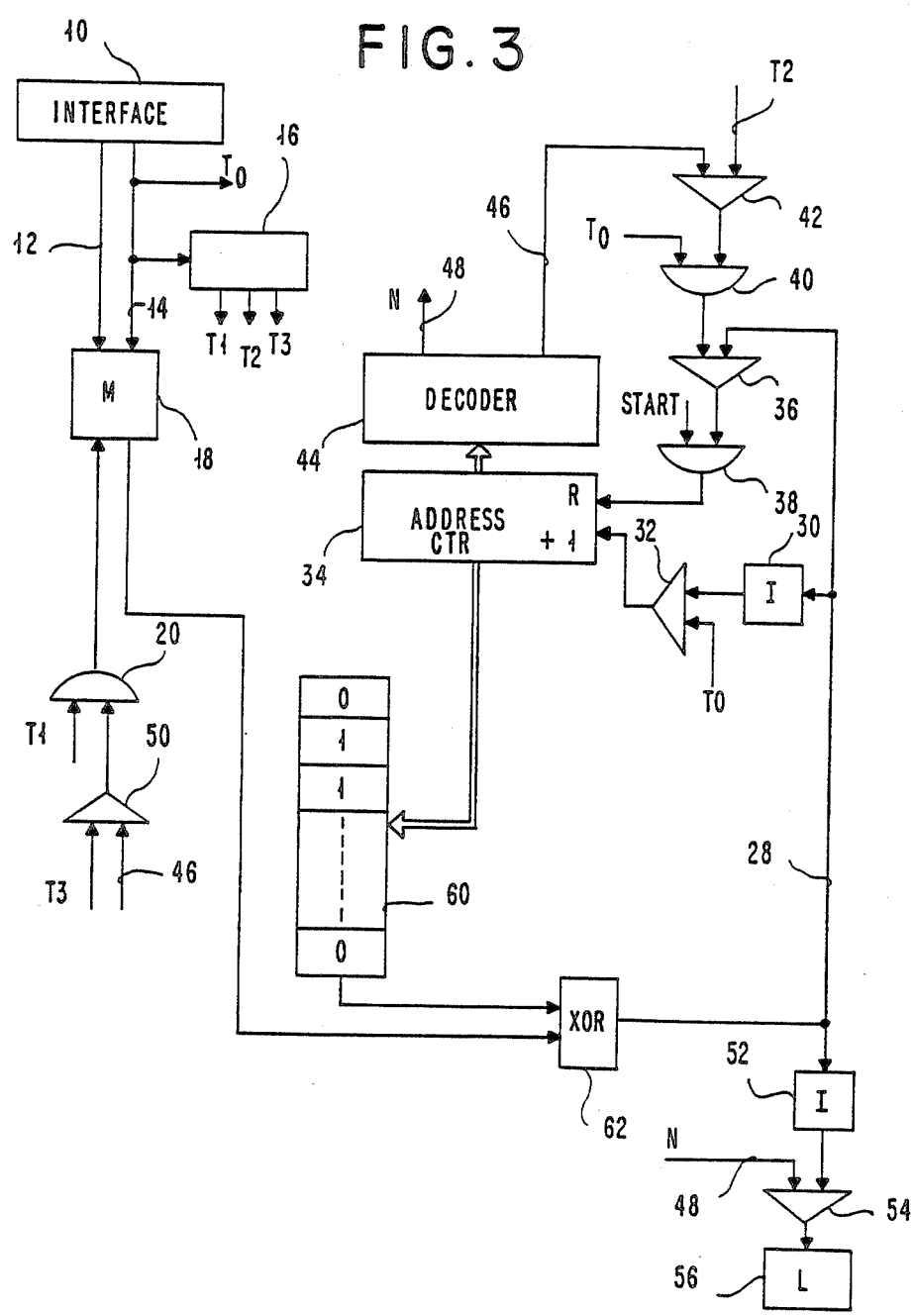
FIG. 3 is a block diagram illustrating an improved version of the device of FIG. 1.

Referring now to FIG. 3, there is shown an improved version of the device of FIG. 1, in which the 1's Table and the 0's Table have been replaced by a single table. The device of FIG. 3 is identical to that of FIG. 1, except that memories 22 and 26 have been replaced by a memory 60 of N×1 positions and that inverter 24 has been replaced by an Exclusive OR circuit 62. Elements performing the same functions in both figures are indicated by the same reference numerals. In FIG. 3, the output from memory 18 is applied to an input of Exclusive OR circuit 62, whose other input is connected to the output of memory 60 and whose output is connected to line 28.

The decision table within memory 60 contains N entries, each of which is representative of the particular bit pattern to be detected. In the example shown in FIG. 3, the decision table contains an exact replica of that bit pattern. Whenever a bit is received over line 12, a table lookup operation is performed to determine whether the entry at the address specified by address counter 34 contains a bit identical to the received bit, in which case a "0" bit will be obtained at the output of Exclusive OR circuit 62, address counter 34 will be incremented by 1, and the device will then wait for another bit to be received over line 12.

If the entry at the address specified by counter 34 does not contain an identical bit, then, if said address is zero, the content of the counter will be maintained at zero and the device will wait for another bit to be received over line 12, or, is the address is different from zero, the counter will be reset to zero and the bit on line 12 will again be presented to the table, this time to address zero.

Detection of the bit pattern is complete when counter 34 contains address N and the last bit in the pattern is identical to the bit with which it is compared in the train of bits.

Figure 4:
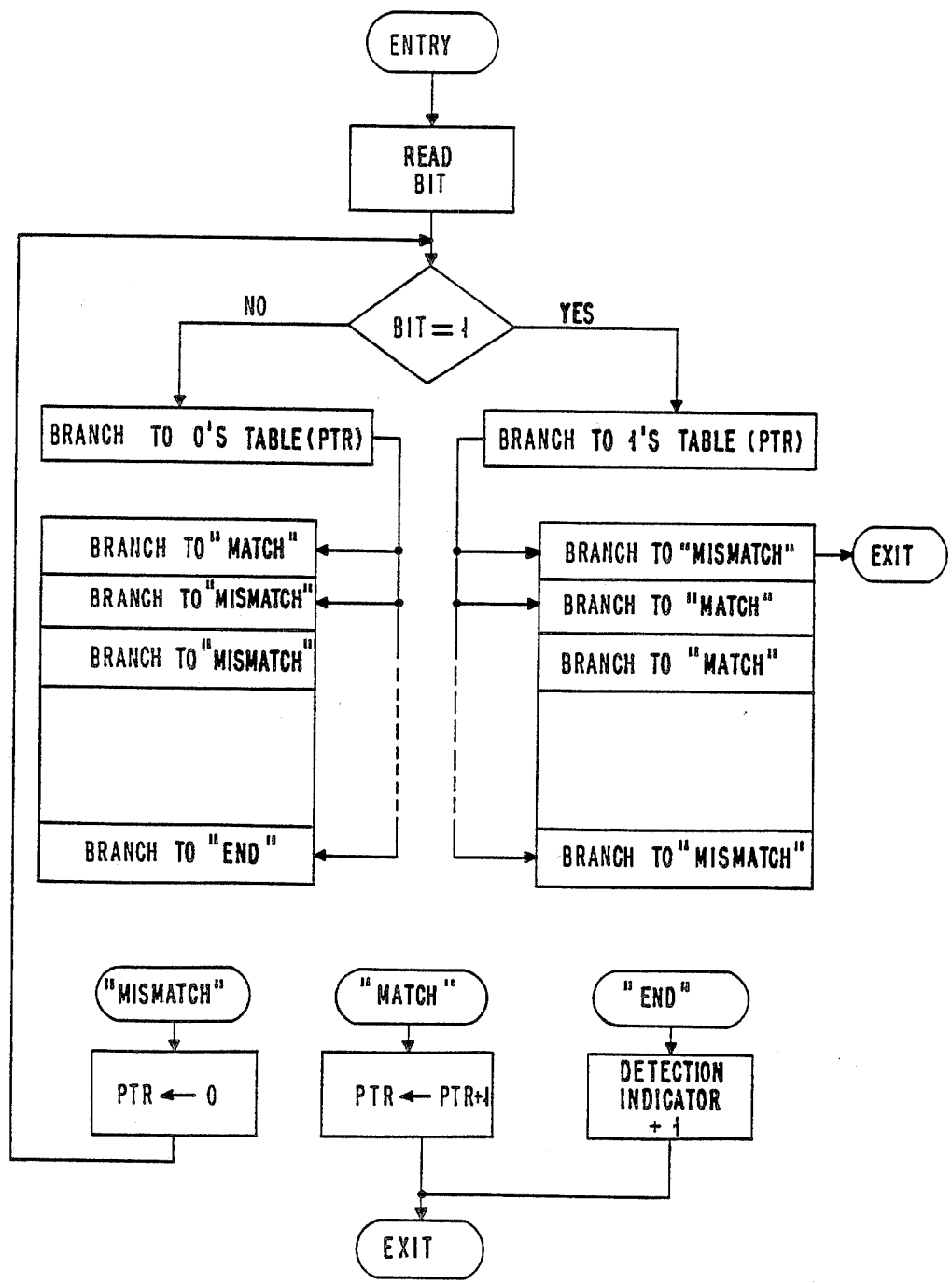
FIG. 4 is a block diagram illustrating by way of example another embodiment of the invention.

Referring now to FIG. 4, there is shown a diagram illustrating the manner in which a microprogram can be used to implement the present method, more particularly with respect to the 1's Table and the 0's Table described with reference to FIG. 1. In the example shown in FIG. 4, each entry in said tables contains an unconditional branch instruction, as described hereafter. Initially, a pointer (PTR) is set to zero. The first bit received from the interface is read out. If the bit is "0", a branch to the 0's Table takes place, the branch address being provided by the pointer, that is, zero. Since the first bit of the pattern to be detected is, in this example, a "0" bit, the instruction contained in the entry at address zero specifies a branch to a "MATCH" subprogram that causes the pointer to be incremented and the device to wait for another bit.

If the first bit received is a "1" bit, a branch is made to the 1's Table, the branch address indicated by the pointer being zero. Since the first bit of the pattern to be detected is "0", the instruction contained in the entry at address zero of the 1's Table specifies a branch to the exit, pending receipt of another bit to be processed. If the second bit received is "1", a branch to address 1, indicated by the pointer, of the 1's Table takes place. Since this bit matches the second bit of the pattern to be detected, the entry at address 1 of the 1's Table will contain an instruction specifying a branch to the "MATCH" subprogram. If the second bit received is a "0" bit, a branch to address 1 of the 0's Table takes place, this address being indicated by the pointer. As this bit does not match the second bit of the pattern to be detected, the entry at address 1 of the 0's Table will contain a branch instruction specifying a branch to a "MISMATCH" subprogram, which will cause the pointer to be reset to zero and the second bit received from the interface to be presented again to the appropriate table.

The instruction contained in the last entry of the 0's Table specifies a branch to an "END" subprogram which sets a Bit Pattern Detected indicator.

While the invention has been shown and described with reference to a preferred embodiment thereof, it will be understood by those skilled in the art that various changes in form and details may be made therein without departing from the spirit and scope of the invention.

What is claimed is:

1. A device for detecting a particular pattern of N bits in a serial train of binary coded bits, said device comprises:

an address generator;

first storage means containing a first table of N entries, the $n^{th}$ of which comprises an information item denoting a match or a mismatch depending on whether the $n^{th}$ bit of the bit pattern to be detected has a first or a second binary value;

second storage means containing a second table of N entries, the $n^{th}$ of which comprises an information item denoting a match or a mismatch depending on whether the $n^{th}$ bit of the bit pattern to be detected has said second binary value or not;

means for selecting an entry in said first or second storage means according to whether the bit being examined in the train of bits has said first or second binary value, the address of said entry being indicated by the address generator;

means for incrementing by one the content of said address generator when the addressed entry contains an information item denoting a match;

means for resetting to zero the content of said address generator when the addressed entry contains an information item denoting a mismatch, and for addressing the first entry in said first or second storage means according to whether the bit being examined has said first or second binary value, if the content of said address generator is different from zero; and means for indicating that said bit pattern has been detected when the content of said address generator is N and the addressed entry contains an information item denoting a match.

2. A method of detecting a unique pattern of N sequential binary bits in a serial train of bits, said method comprises the steps of:

establishing an address pointer value which can be controlled to assume any one of N values;

establishing a first table which includes N addressable locations each of which in sequence corresponds to one of the N bits in the unique pattern of N sequential bits and storing in sequence in each said location a first information item indicating a match when the corresponding sequential bit in the train assumes a first value and a second information item indicating a mismatch when the corresponding sequential bit in the train assumes a second value;

establishing a second table which includes N addressable locations each of which in sequence corresponds to the N bits in the unique pattern of N sequential bits and storing in sequence in each said location a first information item indicating a match when the corresponding sequential bit in the train assumes said second value and a second information item indicating a mismatch when the corresponding sequential bit in the train assumes said first value;

receiving and examining in sequence the individual bit contained in the train of bits, and if the bit being examined has said first value accessing the information item in the first table under control of said address pointer value, or if the bit being examined has said second value accessing the information item in the second table under control of said address pointer value;

incrementing by one the address pointer value if the information item accessed indicates a match and repeating the above sequence of steps for the next bit in the train of bits or resetting the address pointer to its lowest value if the information item accessed indicates a mismatch and thereafter repeating the above sequence of steps for the current bit in the train of bits whenever the address pointer value prior to resetting was at a value greater than the lowest value or for the next bit when the address pointer was at its lowest value; and indicating that the unique pattern of N sequential binary bits has been detected when the address pointer value attains its maximum value and the information item then being accessed under control of maximum pointer value indicates a match.

* * * * *

UNITED STATES PATENT AND TRADEMARK OFFICE
CERTIFICATE OF CORRECTION

PATENT NO. : 4,734,676

DATED : March 29, 1988

INVENTOR(S) : Simon Huon et al

It is certified that error appears in the above-identified patent and that said Letters Patent is hereby corrected as shown below:

On the face of the patent, change the filing date from "May 17, 1985" to

-- June 17, 1985 --.

Signed and Sealed this

Second Day of August, 1988

Attest:

DONALD J. QUIGG

Attesting Officer

Commissioner of Patents and Trademarks